United States Patent [19]

Hayakawa

[11] 4,396,224
[45] Aug. 2, 1983

[54] WIND DEFLECTOR OF A SUNSHINE ROOF OF VEHICLES

[75] Inventor: Shoichi Hayakawa, Mishima, Japan

[73] Assignee: Toyota Jidosha Kogyo Kabushiki Kaisha, Toyota, Japan

[21] Appl. No.: 286,966

[22] Filed: Jul. 27, 1981

[30] Foreign Application Priority Data

Aug. 13, 1980 [JP] Japan .............................. 55-110321

[51] Int. Cl.³ ................................................ B60J 7/22
[52] U.S. Cl. ................................................ 296/217
[58] Field of Search .................................... 296/217, 91

[56] References Cited

U.S. PATENT DOCUMENTS

| | | | |
|---|---|---|---|
| 3,203,727 | 8/1965 | Werner | 296/217 |
| 3,904,239 | 9/1975 | Jardin | 296/217 |
| 4,067,604 | 1/1978 | Mori | 296/217 |

FOREIGN PATENT DOCUMENTS

188231 2/1956 Austria .............................. 296/217

*Primary Examiner*—Robert R. Song
*Attorney, Agent, or Firm*—Parkhurst & Oliff

[57] ABSTRACT

A motor vehicle has a sunshine roof with a substantially rectangular opening and a wind deflector comprising a flat strip plate pivotally mounted along the front edge of the sunshine roof opening so as to be opened and closed. The sunshine roof is formed with a sunshine roof channel having an appropriate width along the inner periphery of the opening. The wind deflector can be housed in the sunshine roof channel when it is in the closed position. The wind deflector has a shape which is defined by a central portion having a substantially uniform width in the front and rear direction and opposite end portions, the width in the front and rear direction of the end portions extending rearwardly.

2 Claims, 7 Drawing Figures

WIND DEFLECTOR OF A SUNSHINE ROOF OF VEHICLES

BACKGROUND OF THE INVENTION

1. Field of the Invention

The present invention relates to a motor vehicle having a sunshine roof with a substantially rectangular opening, and more particularly relates to a wind deflector mounted on the sunshine roof for preventing wind turbulence from occurring.

2. Description of the Prior Art

In the prior art, there is known a vehicle with a slide type sunshine roof in wich a roof cover is slidingly opened or closed, and there is also known a detachable type sunshine roof in which a roof cover is detachably mounted on the vehicle roof. In either type these sunshine roofs, when the roof cover is opened, air vibration or air noise, usually referred to as "wind throb," may occur due to wind velocity. In order to prevent such wind throb from occurring, there is also known a sunshine roof having a wind deflector mounted on the front edge of the sunshine roof opening. However, the conventional type wind deflector is made of a flat strip plate, or is made of two separated plates placed at the opposite front edges of the sunshine roof opening. With the wind deflector comprising a flat strip plate, wind from the transverse direction may easily give rise to wind turbulence, and with the wind deflector comprising two separated plates, it is impossible to completely prevent wind turbulence at the central portion of the deflector. Even if, in the conventional wind deflector, the dimension or width of the deflector is enlarged in order to prevent wind turbulence, some problems occur, for instance, wind noise increases and it is difficult to house the deflector within the vehicle cabin.

SUMMARY OF THE INVENTION

An object of the present invention is to provide a wind deflector of a vehicle sunshine roof capable of overcoming the defects mentioned above.

Another object of the present invention is to provide a wind deflector of a vehicle's sunshine roof capable of completely preventing wind throb from occurring and capable of being housed in the vehicle cabin.

According to the present invention, in a motor vehicle having a sunshine roof with a substantially rectangular opening, and a wind deflector comprising a flat strip plate pivotally mounted along the front edge of said sunshine roof opening so as to be opened and closed, characterized in that said wind deflector has a shape which is defined by a central portion having a substantially uniform width in the front and rear direction and opposite end portions, the width in the front and rear direction of said end portions extending rearwardly.

The wind deflector of the present invention may be used for a detachable type sunshine roof as well as for a slide type sunshine roof of vehicles.

According to a preferred embodiment of the present invention, in a motor vehicle having a sunshine roof with a substantially rectangular opening, and a wind deflector comprising a flat strip plate pivotally mounted along the front edge of said sunshine roof opening so as to be opened and closed, characterized in that said sunshine roof is formed with a sunshine roof channel having an appropriate width along the inner periphery of said opening, and that said wind deflector can be housed in said sunshine roof channel when it is in the closed position, and said wind deflector has a shape which is defined by a central portion having a substantially uniform width in the front and rear direction and opposite end portions, the width in the front and rear direction of said end portions extends rearwardly.

DESCRIPTION OF A PREFERRED EMBODIMENT

Figure 1:
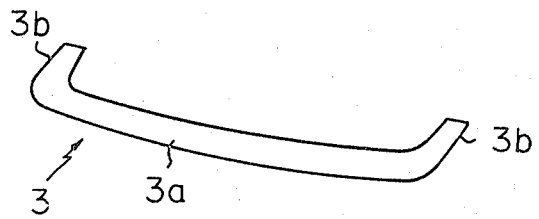
FIG. 1 is a perspective view of a wind deflector for a vehicle sunshine roof according to the present invention.
Figure 2:
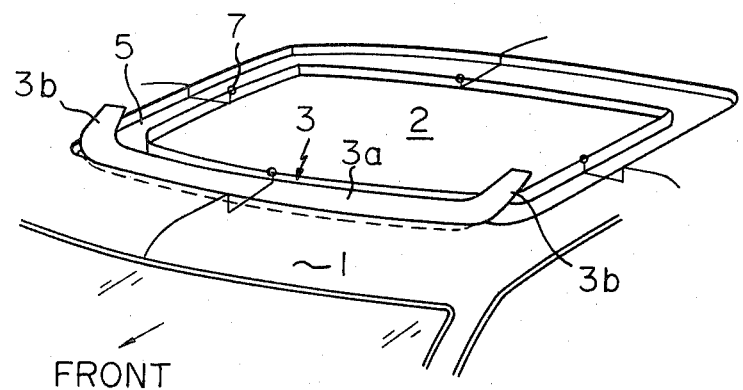
FIG. 2 is a perspective view showing the wind deflector of the present invention which is mounted on a vehicle sunshine roof.

Referring now to FIGS. 1 and 2, a vehicle roof 1 is provided with a substantially rectangular sunshine opening 2 which can be closed by a cover member not shown in the drawings. The sunshine roof is formed with a sunshine roof channel 5 having an appropriate width along the inner periphery of the opening 2. A wind deflector 3 which can be housed in the sunshine roof channel 5 is mounted on the front edge of the opening 2 so that the deflector 3 is pivotally moved between the open position and the closed position thereof.

The wind deflector 3 of the present invention comprises a flat strip plate, which is in the shape of a so called "ox horn," as illustrated in FIGS. 1 and 2, that is, the wind deflector 3 has its central portion 3a which has a generally uniform width so as to be fitted into the front portion of the sunshine roof cannel 5, and its opposite edge portions 3b which are rearwardly elongated to about 40 cm. These edge portions 3a are so dimensioned that they can be fitted into the front end portion of the opposite sides of the sunshine roof channel 5.

Figure 3:
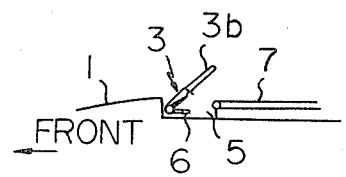
FIG. 3 is a schematic view showing the wind deflector in the open position.
Figure 4:
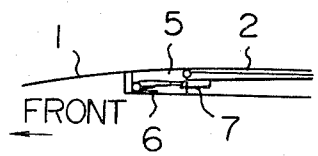
FIG. 4 is a schematic view showing the wind deflector in the closed position.

FIGS. 3 and 4 illustrate the wind deflector 3 of the present invention in its open position and in its closed position, respectively. The wind deflector 3 can be pivotally moved between its open and closed positions about the front edge of the roof opening 2, that is, about the front edge of the front sunshine roof channel 5. When the wind deflector 3 is in the open position, as illustrated in FIG. 3, the angle of the deflector with respect to the horizontal surface is about 30 to 45 degrees. When the wind deflector 3 is in the closed position, as illustrated in FIG. 4, the deflector is housed in the front sunshine roof channel 5 defined between the roof portion 1 and a weather strip 7 provided in the side of the vehicle cabin. The pivotal shaft of the wind deflector 3 is equipped with a spring 6 so that the wind deflector 3 automatically jumps up to the outside of the vehicle cabin when the roof cover (not shown) is removed or slidingly opened.

According to the wind deflector 3 of the present invention, an air stream passing over the center portion of the roof 1 is prevented from entering into the vehicle cabin by the central portion 3a of the wind deflector 3, and a lateral air flow or an air stream passing over the side portions of the roof is prevented from coming into the vehicle cabin by the opposite elongated edge portions 3b of the wind deflector 3, thereby it is possible to almost completely prevent the so called "wind throb" from occurring. Although, in a conventional wind deflector comprising a flat strip plate, there is a serious problem that if the dimension of the deflector is enlarged, the so called "wind trob" can be prevented, but wind noise (which is caused by the air stream striking the deflector) is increased, according to the wind deflector 3 of the present invention, the so called "wind throb" can be almost completely prevented, as well as the wind noise can be diminished remarkably.

Figure 5:
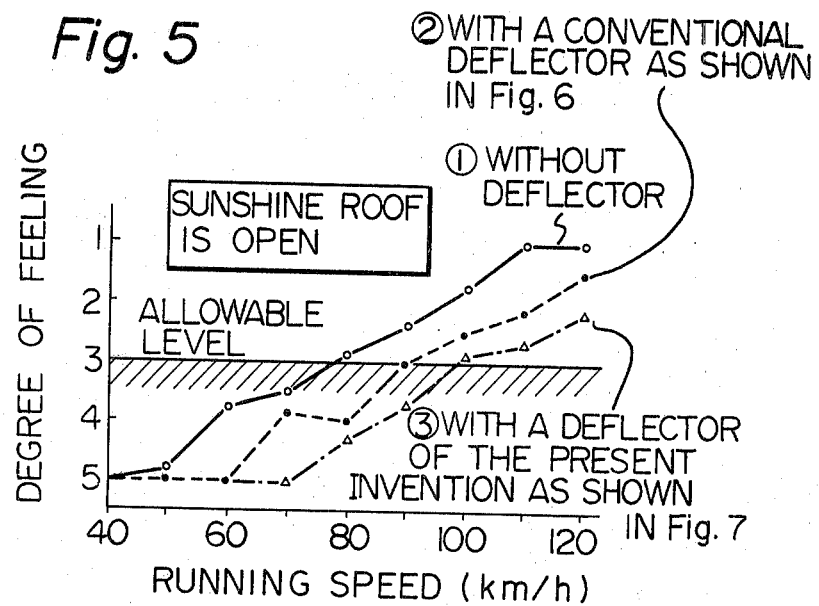
FIG. 5 is a diagram showing experimental results in a field running test using sunshine roof vehicles without a wind deflector, with a conventional type wind deflector and with a wind deflector of the present invention.
Figure 6:
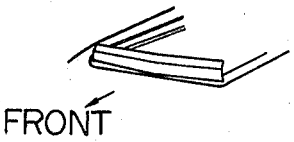
FIG. 6 is a schematic perspective view of a conventional wind deflector used in the field test; and, FIG. 7 is a schematic perspective view of a wind deflector of the present invention used in a field test.
Figure 7:
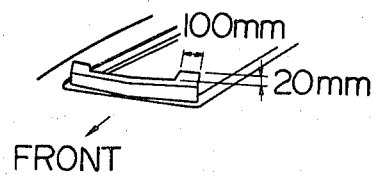

FIG. 5 and the following table show the experimental results in a field running test, in which sunshine roof vehicles ① without a wind deflector, ② with a conventional wind deflector known in the prior art, and ③ with a wind deflector of the present invention were used. FIG. 6 is a schematic perspective view of the conventional wind deflector which was used in the field test, and FIG. 7 is a schematic perspective view of the wind deflector designed in accordance with the present invention which was used in the field test.

TABLE

|  | Without deflector (Sunshine roof was open) | Conventional flat deflector (width about 45 mm) | Conventional flat deflector (The width enlarged by about 20 mm) | Deflector of the present invention |
|---|---|---|---|---|
| WIND THROB | 1 | 2.5 | 4 | 5 |
| WIND NOISE | x | 3 | 1 | 4 |
| WIND EN-TANGLE-MENT | 1 | 3 | 2 | 4 |

In the above table:
1 ... Very uncomfortable feeling
2 ... Uncomfortable feeling
3 ... A little uneasy feeling
4 ... Just a little uneasy feeling
5 ... Good An understood from FIG. 5, according to the conventional type wind deflector, the wind throb exceeded the allowable level when the vehicle was running at a speed of more than 90 km/hour. According to the wind deflector of the present invention, which deflector has at the opposite ends thereof enlarged portions each having 100 mm length and 20 mm width, the wind throb was under the allowable level when the vehicle was running at a speed of less than 100 km/hour.

I claim:

1. In a motor vehicle having a sunshine roof with a substantially rectangular opening, and a wind deflector comprising a flat strip plate pivotally mounted along the front edge of said sunshine roof opening so as to be opened and closed, characterized in that said wind deflector has a shape which is defined by a central portion having a substantially uniform width in the front and rear direction and opposite end portions, the width in the front and rear direction of said end portions extending rearwardly, and that said opposite end portions are obliquely and upwardly directed toward the rear of the vehicle when said wind deflector is in the opened position.

2. In a motor vehicle having a sunshine roof with a substantially rectangular opening, and a wind deflector comprising a flat strip plate pivotally mounted along the front edge of said sunshine roof opening so as to be opened and closed, characterized in that said sunshine roof is formed with a sunshine roof channel having an appropriate width along the inner periphery of said opening, that said wind deflector can be housed in said sunshine roof channel when it is in the closed position, and said wind deflector has a shape which is defined by a central portion having a substantially uniform width in the front and rear direction and opposite end portions, the width in the front and rear direction of said end portions extending rearwardly, and that said opposite end portions are obliquely and upwardly directed toward the rear of the vehicle when said wind deflector is in the opened position.

* * * * *